O. J. WEEKS.
RECEPTACLE.
APPLICATION FILED MAR. 26, 1908.
924,205.
Patented June 8, 1909.
2 SHEETS—SHEET 1.
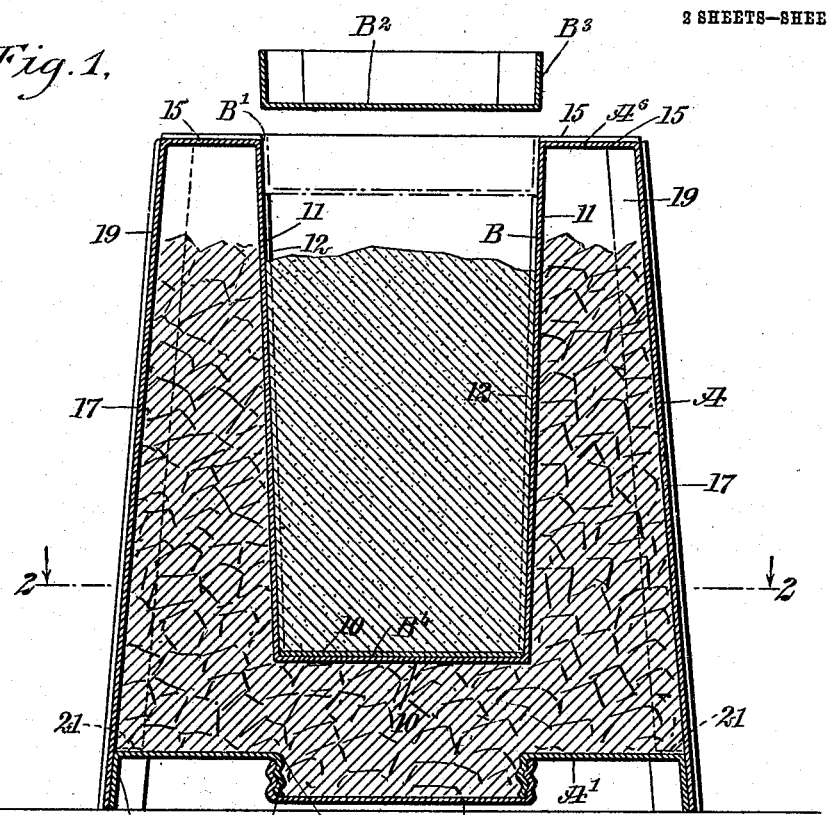
Fig. 1,
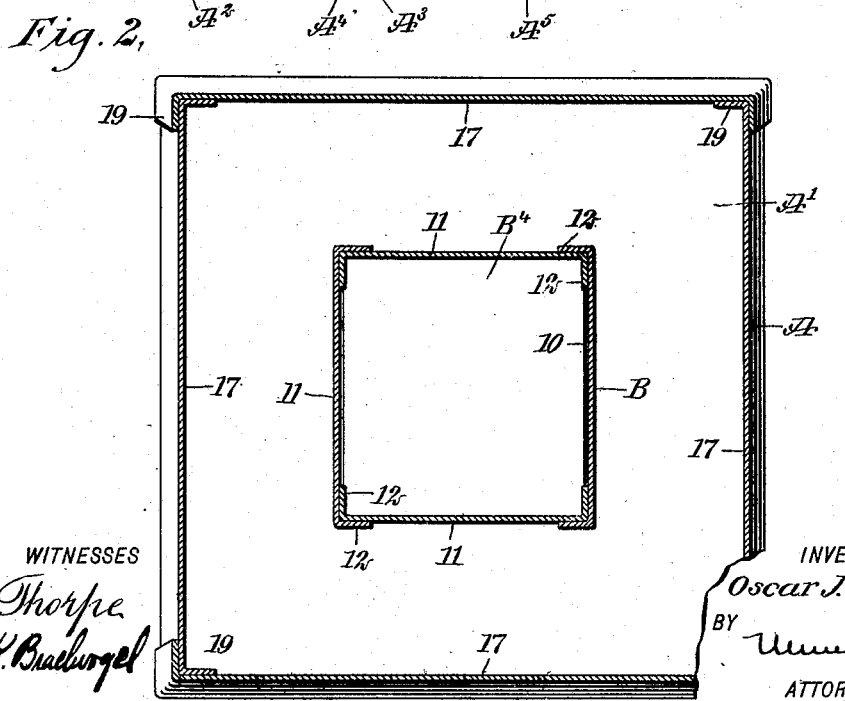
Fig. 2,
WITNESSES
E. Thorpe
J. K. Bracburgel
INVENTOR
Oscar J. Weeks
BY
ATTORNEYS
THE NORRIS PETERS CO., WASHINGTON, D. C.

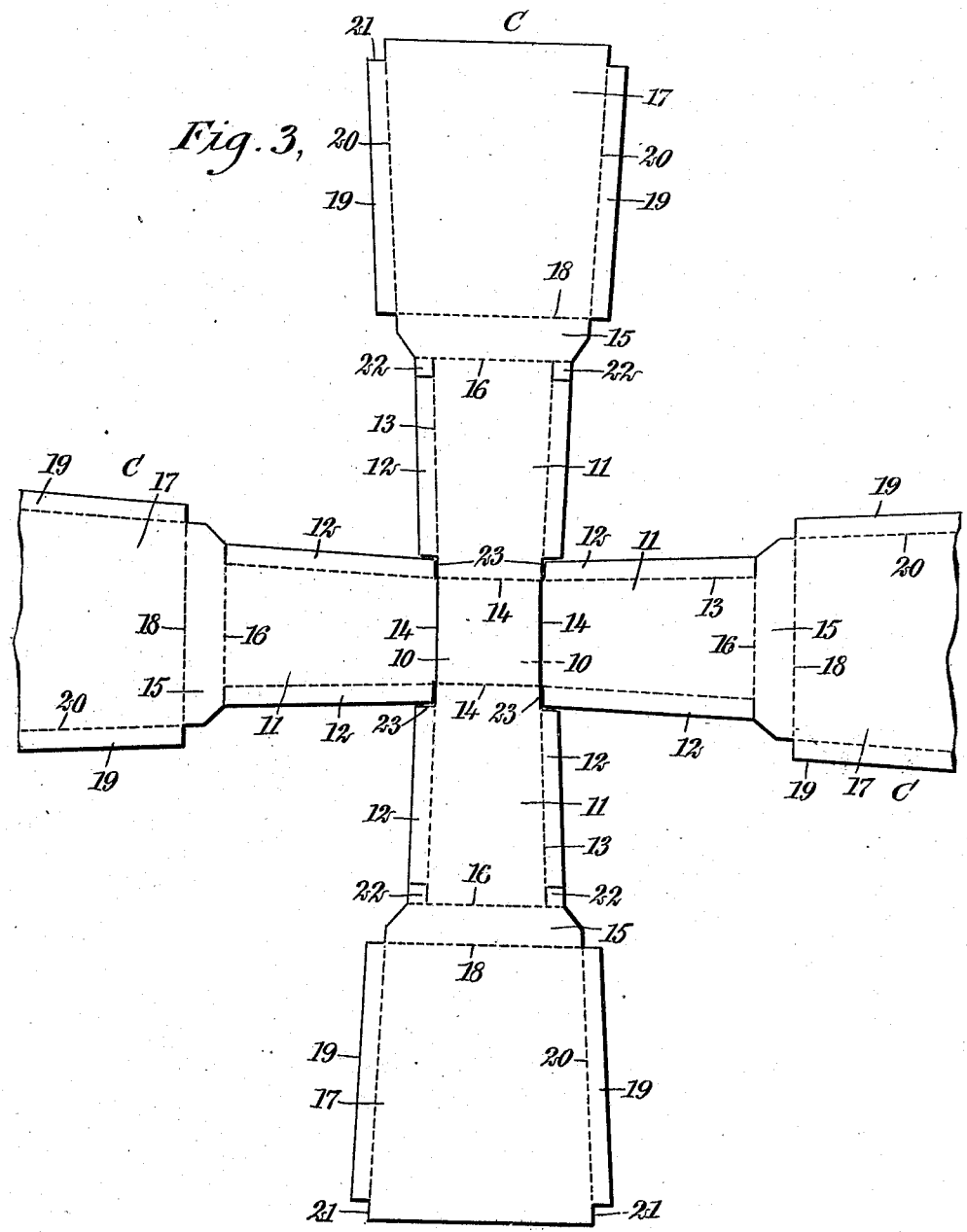

UNITED STATES PATENT OFFICE.

OSCAR J. WEEKS, OF NEW YORK, N. Y.

RECEPTACLE.

No. 924,205.  Specification of Letters Patent.  Patented June 8, 1909.

Application filed March 26, 1908. Serial No. 423,372.

*To all whom it may concern:*

Be it known that I, OSCAR J. WEEKS, a citizen of the United States, and a resident of the city of New York, borough of Brooklyn, in the county of Kings and State of New York, have invented a new and Improved Receptacle, of which the following is a full, clear, and exact description.

This invention relates to receptacles or carriers for ice cream, oysters, liquid and the like, and more particularly to a receptacle comprising an inner and an outer vessel, the inner one of which receives the ice cream or other substance to be preserved therein, and the outer one of which receives the ice or other refrigerant. The vessels are oppositely tapered or otherwise so formed that the contents thereof can be easily introduced and removed.

Further, the invention relates to a receptacle for ice cream and the like, fashioned from paper, card-board or other similar material and formed from blanks folded and glued, cemented or otherwise secured together, so that at the edges or seams of the receptacle the walls are of double thickness, and so that at weak points the receptacle has reinforcing flaps, tabs or extensions.

An object of the invention is to produce a simple, strong and durable receptacle or carrier for ice cream and the like, which can be constructed so cheaply that the retailer can, if he so desire, give it away with his wares, by means of which the ice cream or other contents of the receptacle can be transported for long distances, or can be kept for comparatively long periods without injury, and which is of such shape that a number of receptacles can be piled or arranged together in a small space.

A further object of the invention is to provide a device of the class described, so formed that the inner vessel is entirely surrounded by an outer vessel for the refrigerant, and in which the closures for the vessels fit so closely and are of such form that leakage from the vessels is practically obviated.

A still further object of the invention is to provide a double receptacle having an inner and an outer vessel, the openings of which are at opposite ends, and which are oppositely tapered so that the contents thereof can be introduced and removed without difficulty, the receptacle being formed from cheap material such as paper, card-board or the like, paraffined or otherwise rendered water-proof, and fashioned from specially shaped blanks folded and secured to form the vessels.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of the receptacle, showing ice cream and a refrigerant in the vessels thereof; Fig. 2 is a transverse section on the line 2—2 of Fig. 1; Fig. 3 is a plan view showing the blanks from which the receptacle is formed, in position to be folded and secured; and Fig. 4 is a perspective view showing a portion of the receptacle and the manner of fastening the blanks at one of the corners.

Before proceeding to a more detailed explanation of my invention it should be clearly understood that while the same is particularly useful for carrying and preserving ice cream and the like, it can also be advantageously used for transporting and storing other substances, preferably food stuffs or the like, which are of a perishable nature, and which are customarily preserved by means of a refrigerant such as a mixture of ice and salt. The manufacturers of ice cream and similar food stuffs usually retail their wares and deliver them to their customers in cans or other vessels arranged in wooden buckets partly filled with ice and salt. These buckets are heavy and are difficult to transport. Furthermore, they are expensive and are frequently lost, and it is necessary for the dealer to have them called for after delivery. This all entails considerable expense and trouble. By means of my invention it is possible to provide a suitable receptacle for carrying and delivering ice cream, which can be manufactured so inexpensively that the dealer, if he desires to do so, need not call for the receptacle but can give it away with the wares which he purveys. I prefer to fashion the receptacle from heavy paper, card-board or the like, paraffined or otherwise rendered impervious to moisture.

As shown in the accompanying drawings, the receptacle is fashioned preferably of substantially square cross-section; this form permits a number of receptacles to be piled compactly, and thus is necessitated a comparatively small space only, for transporting a number of them. The inner and outer vessels of the receptacle are integral and are formed by suitably bending, folding and securing two blanks of similar and symmetrical form which are arranged transversely of one another and at substantially right angles, as will appear more clearly hereinafter. The openings of the vessels are at opposite ends and the vessels are oppositely tapered to permit the easy introduction and removal of the contents. The top of the outer vessel is formed by the integral connecting portions between the inner and the outer vessels, and the bottom of the outer vessel is formed by a separate piece having preferably, a filling opening with a screw cap. The opening of the inner vessel has a cover or lid fashioned from a separate piece, and is placed in position by merely inserting it in the opening.

Referring more particularly to the drawings, A represents the outer vessel of the receptacle, which is tapered and has the bottom A′ provided with a laterally disposed flange A² having the same taper as the vessel, and inserted in the open end thereof. The bottom A′ has an opening A³ provided with an outwardly disposed threaded neck A⁴ upon which fits a correspondingly threaded closing cap A⁵. The inner vessel B is connected with the outer vessel A by the integral top A⁶ of the latter and is tapered oppositely to the outer vessel. The opening B′ of the inner vessel is opposite to the opening A³ of the outer vessel and is closed by means of a removable cover B² having a laterally disposed flange B³ of a taper similar to the taper of the vessel B.

It has been found of advantage in vessels of paper or the like for containing moist substances, to provide means for maintaining the bottom of the receptacle out of contact with a table or other support upon which the receptacle may be placed, and thus to keep the contents thereof held a suitable distance above the support.

It will be noted that by providing the bottom A′ and the cover B² of my receptacle with the flanges or rims A² and B³ respectively, the bottom A′, or the cover B², are always held from contact with a support when the receptacle is set thereupon in a normal or an inverted position.

The receptacle is fashioned from two elongated blanks C of similar and symmetrical form. Each of the blanks C has a central portion 10, the opposite sides of which are parallel, and which are in contact when the blanks are placed in position to be folded to form the receptacle, as is shown most clearly in Fig. 3. The superposition of one blank upon the other with one portion 10 upon the corresponding portion 10, provides a double bottom B⁴ for the inner vessel B. The advantage of this construction is obvious. Each of the blanks has the portion 10 extended at opposite ends to form outwardly tapered sections 11 which form opposite side walls of the inner vessel B. The sections 11 at the side edges have elongated flaps 12 formed by plicatures or crease lines 13 to permit the flaps to be easily folded in forming the receptacle. The portions 10 of the blanks are demarked from the sections 11 by suitable crease lines 14. At the outer ends of the sections 11 are laterally extended sections 15 demarked by crease lines 16 and subsequently forming the top A⁶ connecting the inner and the outer vessels. Integral with the sections 15 and demarked therefrom by suitable crease lines 18, are further sections 17 outwardly tapered and serving to form opposite side walls of the outer vessel A. At the lateral edges, the sections 17 have flaps 19 demarked from the sections 17 by plicatures or crease lines 20.

The flaps 19 have cut away portions 21 at the outer ends for a purpose which will appear more clearly hereinafter. At the outer ends, the flaps 12 of one of the blanks C are cut away to leave tabs 22 integral with the sections 15. The flaps 12 of one of the blanks C have at the ends adjacent to the portion 10, cut away parts 23 to permit the flaps 12 of the other blank C to be positioned therebetween and adjacent to the portion 10 of the first blank.

In forming the receptacle, the blanks are folded at the plicatures or crease lines 14 until the adjacent sections 11 engage at the crease lines 13; the flaps 12 are then laterally bent and secured to the adjacent sections 11 as is shown most clearly in Fig. 2. In this way, the inner vessel is provided at the edges with walls of double thickness. The sections 15 are outwardly disposed to form the top A⁶, being folded at the plicatures or crease lines 16 and 18. At the ends, the sections 15 overlap and are glued, cemented or otherwise secured together in a manner similar to the securing in place of the flaps 12. The tabs 22 of two of the sections 15 extend over the other sections 15, as is most clearly shown in Fig. 4, and thus provide additional means for securing the sections together. The sections 17 are secured together by means of the flaps 19 as are the sections 11, by the flaps 12. In this way, too, the walls of the outer vessel are of double thickness at the seams or edges. Owing to the tapered form of the sections 11 and 17 the resulting vessels are oppositely tapered as is shown most clearly in Fig. 1.

By providing the flaps 12 of one of the blanks C at the inner ends with cut away portions 23, the flaps 12 of the other blank C can extend the entire lengths of the sections 11 of the first blank. The tabs 22 leave cut away portions at the upper ends of the flaps 12, which permit the cover B² to be inserted tightly into the opening of the inner vessel, without offsetting by the flaps from the sides of the vessel. Furthermore, the upper ends of the flaps 12 of this blank C, thus provide supporting means for the cover and serve to limit the insertion thereof into the vessel. The cut away portions 21 of the sections 17 of one of the blanks C serve a like purpose for the bottom A' of the outer vessel.

Having thus described my invention, I claim as new and desire to secure by Letters Patent:—

1. A receptacle, comprising an inner and an outer vessel, one of said vessels having overlapping portions whereby the walls of said vessel are of double thickness at the edges, said vessel having an open end, and further having the overlapping portions cut away at the open end to permit the insertion of a cover, and a cover for the open end.

2. A receptacle, comprising an inner and an outer vessel, said vessels having overlapping portions whereby the walls of said vessels are of double thickness at the edges, said vessels at opposite ends each having an open end, said vessels further having the overlapping portions cut away at the open ends to permit the insertion of covers, and covers for the open ends, said cut away portions forming stops to limit the insertion of said covers into the open ends, said vessels being tapered.

3. A receptacle, comprising an inner and an outer vessel, and formed from blanks arranged transversely of one another and folded to form said vessels.

4. A receptacle, comprising an inner and an outer vessel and formed from similar and symmetrical elongated blanks arranged transversely of one another and folded to form said vessels, said blanks being shaped so that the openings of said vessels are at opposite ends of the receptacle.

5. A receptacle, comprising an inner and an outer vessel, and formed from similar symmetrical blanks arranged transversely of one another and folded to form said vessels, said blanks having at adjacent edges, overlapping flaps, said blanks being arranged to form a double bottom for one of the vessels.

6. A receptacle, comprising an inner and an outer vessel and formed from a plurality of blanks, each of said blanks being folded to form opposite walls of each of said vessels.

7. A receptacle, comprising an inner and an outer vessel and formed from a plurality of blanks arranged at angles with each other, each of said blanks being folded to form two opposite walls of each of said vessels, said blanks, at the edges, having flaps adapted to be secured together to form the edges of the vessels of double thickness.

8. A receptacle, comprising an inner and an outer vessel and formed from blanks superposed to form a double bottom for said inner vessel, each of said blanks having sections folded so that said sections are spaced and form corresponding sides of said vessels.

9. A receptacle, comprising an inner and an outer vessel and formed from blanks superposed to form a double bottom for said inner vessel, each of said blanks having pairs of sections adapted to be folded so that said sections of each pair are spaced and form corresponding sides of said vessels, each of said sections at each of the opposite edges being secured to a corresponding edge of one of said sections of the other of said blanks when said receptacle is completed.

10. A receptacle, comprising an inner and an outer vessel and formed from blanks superposed to form a double bottom for said inner vessel, each of said blanks having pairs of sections adapted to be folded so that said sections of each pair are spaced and form corresponding sides of said inner and said outer vessel when the receptacle is completed, each of said sections at opposite edges having flaps adapted to be secured to adjacent sections of said other blank, the adjacent flaps being arranged at opposite sides of the walls of said vessels whereby said vessels have walls of double thickness at the edges.

11. A receptacle, comprising an inner and an outer vessel and formed from blanks having similar opposite sections, each adapted to form a side wall of said inner vessel, further sections each adapted to form a part of an end of said outer vessel, and still further sections each adapted to form a side wall of said outer vessel, certain of said sections having flaps adapted to be secured to adjacent sections of said other blank.

12. A receptacle, comprising an inner and an outer vessel and formed from blanks superposed and arranged transversely of one another to form a double bottom for said inner vessel, each of said blanks at opposite sides having sections adapted to form side walls of said inner vessel, further sections integral with said sections and adapted to form portions of the top of said outer vessel, and still further sections integral with said further sections and adapted to form side walls of said outer vessel, said blanks being folded so that said sections and said still further sections are arranged spaced though connected by said further sections, said sections and said still further sections having at the opposite edges securing flaps.

13. A receptacle, comprising an inner and an outer vessel and formed from blanks each comprising a central portion, integral tapered sections at opposite sides of said central portion, integral tapered further sections at the ends of said sections, and still further integral tapered sections at the outer ends of said further sections, said blanks being superposed at said portions to form a double bottom for said inner vessel, said sections and said still further sections at opposite longitudinal edges each having flaps wherewith the same can be secured to the other of said blanks, said further sections having the ends overlapping when said receptacle is formed, said sections and said still further sections each forming a side wall of said inner and said outer vessels respectively.

14. A receptacle, having opposite sides formed from a blank including sections, each having edge flaps adapted to be secured to adjacent sections when the receptacle is formed, a cover, certain of said flaps having cut away portions whereby the receptacle is provided with an opening having substantially straight edges to permit said cover to fit tightly thereinto.

15. In combination, a receptacle formed from blanks having sections, each constituting a side wall of the completed receptacle, and having flaps adapted to be secured to adjacent sections at the inside or outside of said adjacent sections, and a cover, said inside flaps having at the ends cut away portions permitting said cover to be inserted in the opening at the end of the receptacle, and in contact therewith at all points of the edges of said cover, said inside flaps forming stops to limit the insertion of said cover.

16. A receptacle, comprising an inner and an outer vessel and formed from blanks having sections constituting side walls of said inner vessel of the completed receptacle, and further sections each forming a part of an end of said outer vessel of the completed receptacle, said sections having flaps adapted to be secured to adjacent sections, a cover, said flaps having cut away portions which permit the insertion of said cover into the end of said inner vessel, the material from said cut away portion forming tabs integral with certain of said further sections and adapted to be secured to others of said further sections when the receptacle is formed.

17. A receptacle comprising an inner and an outer vessel said vessels having corresponding sides formed from a blank section folded to constitute spaced corresponding walls.

18. A receptacle comprising an inner and an outer vessel each having an opening at one end, said openings being at opposite extremities of the receptacle, said vessels having the corresponding sides formed from a blank section folded to form spaced walls constituting the corresponding sides.

19. A receptacle comprising an inner and an outer vessel, each having an opening at one end, said openings being at opposite extremities of the receptacle, said vessels having the corresponding sides formed from blank sections folded to constitute spaced walls and connected by intermediate blank portions each constituting a part of one end of the receptacle.

20. A receptacle comprising an inner and an outer vessel each having an opening at one end, said vessels being oppositely tapered, covers for said openings, said openings being at opposite extremities of the receptacle, said vessels having the corresponding sides formed from single blank sections folded to form spaced walls constituting said corresponding sides, said spaced walls at one end being connected by blank portions to constitute parts of one end of the receptacle.

In testimony whereof I have signed my name to this specification in the presence of two subscribing witnesses.

OSCAR J. WEEKS.

Witnesses:
 JOHN K. BRACHVOGEL,
 EDWARD B. MARSHALL.